United States Patent
Heflin

(10) Patent No.: US 7,236,943 B1
(45) Date of Patent: Jun. 26, 2007

(54) CHARITABLE CONTRIBUTION STATION WITH PROMOTIONAL GAME PIECE FEATURE

(76) Inventor: D. Keith Heflin, 439 Naron Rd., Shelbyville, TN (US) 37160

( * ) Notice: Subject to any disclaimer, the term of this patent is extended or adjusted under 35 U.S.C. 154(b) by 1192 days.

(21) Appl. No.: 09/711,171

(22) Filed: Nov. 9, 2000

(51) Int. Cl.
  G07F 17/40 (2006.01)
  G07F 7/00 (2006.01)
  G07D 11/00 (2006.01)
  G06Q 30/00 (2006.01)
  G07G 1/14 (2006.01)

(52) U.S. Cl. .............................. 705/14; 705/7; 705/26; 705/27; 705/30; 705/39

(58) Field of Classification Search ................. 705/14, 705/7, 26, 27, 30, 39
See application file for complete search history.

(56) References Cited

U.S. PATENT DOCUMENTS

| | | | | |
|---|---|---|---|---|
| 5,506,393 A | * | 4/1996 | Ziarno | 235/380 |
| 5,551,692 A | * | 9/1996 | Pettit et al. | 705/14 |
| 5,555,497 A | * | 9/1996 | Helbling | 705/14 |
| 5,580,310 A | * | 12/1996 | Orus et al. | 463/16 |
| 5,627,356 A | * | 5/1997 | Takemoto et al. | 235/381 |
| 5,687,971 A | * | 11/1997 | Khaladkar | 273/269 |
| 5,709,603 A | * | 1/1998 | Kaye | 463/17 |
| 5,724,518 A | * | 3/1998 | Helbling | 705/1 |
| 5,791,991 A | * | 8/1998 | Small | 463/41 |
| 5,863,044 A | * | 1/1999 | Ince | 273/430 |
| 5,909,794 A | * | 6/1999 | Molbak et al. | 235/380 |
| 6,049,776 A | * | 4/2000 | Donnelly et al. | 705/8 |
| 6,052,674 A | * | 4/2000 | Zervides et al. | 705/40 |
| 6,188,406 B1 | * | 2/2001 | Fong et al. | 715/810 |
| 6,358,151 B1 | * | 3/2002 | Enzminger et al. | 463/43 |
| 6,519,573 B1 | * | 2/2003 | Shade et al. | 705/26 |

FOREIGN PATENT DOCUMENTS

EP  1026642 A1 * 8/2000

* cited by examiner

Primary Examiner—Andrew J. Fischer
Assistant Examiner—Cristina Owen Sherr
(74) Attorney, Agent, or Firm—Waddey & Patterson; Mark J. Patterson; Howard H. Bayless

(57) ABSTRACT

A game system, for soliciting donations to charities and organizations as a promotion to expose charitable groups or other organizations to a wider range of potential donors as well as to expand the locations currently available. To encourage such donations the system includes a sub-system that provides the donor and non-donors alike with an opportunity to play a game of chance with the credits that the person receives with each donation. The donor may then save such credits or play them, and to the extent a person wins, a promotional prize will be awarded.

15 Claims, 4 Drawing Sheets

FLOW CHART CHARITABLE PROMOTIONS SYSTEM

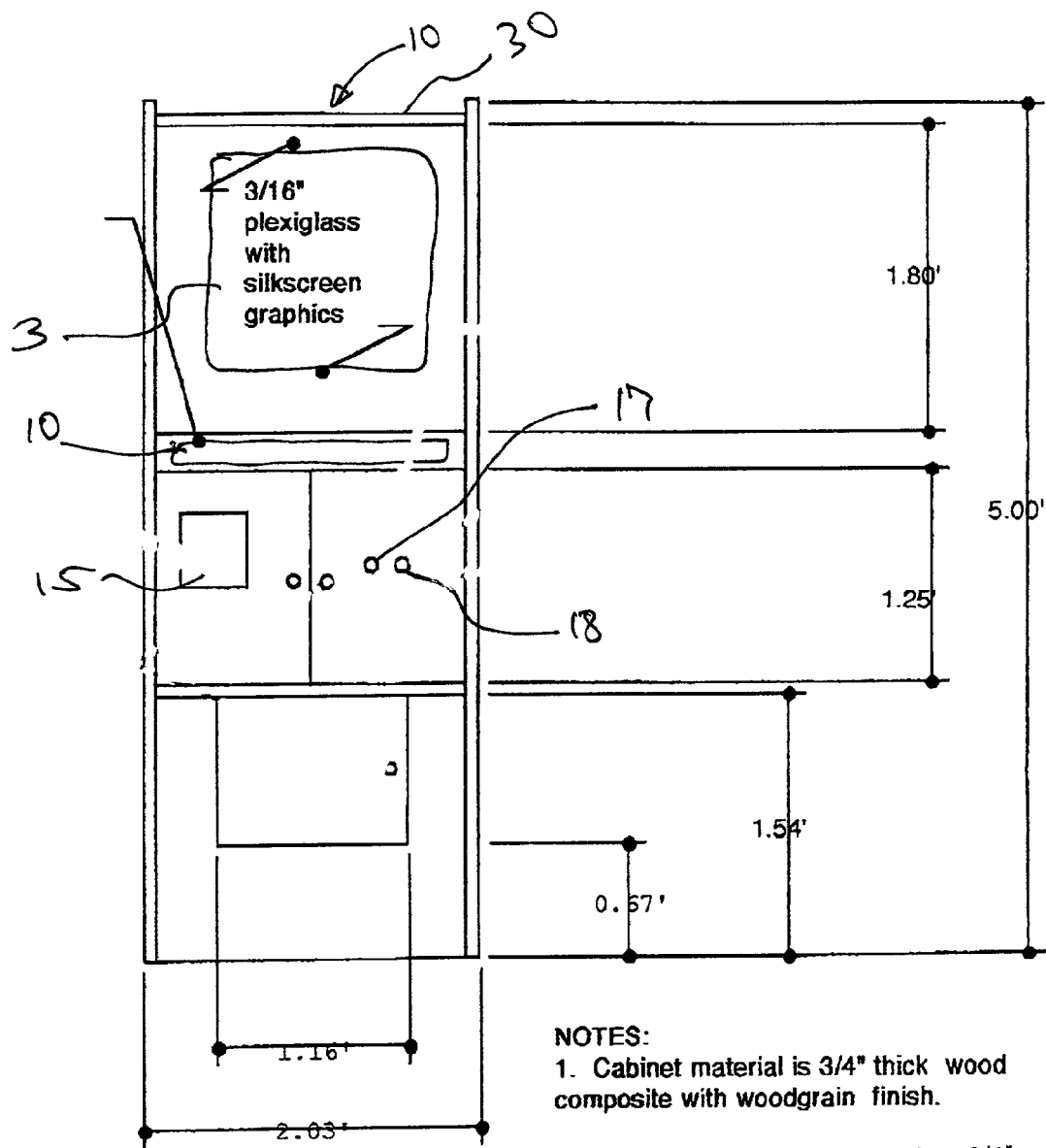

FRONT ELEVATION

SCALE: 1" = 1' - 0"

Fig 2

NOTES:
1. Cabinet material is 3/4" thick wood composite with woodgrain finish.

2. Joining is accomplished using 3/4" x 3/4" pine strips, wood glue, & 1-1/4" woo screws.

3. Access doors are to be manufactured from the same material as cabinet and attatched using continuous hinge. Openings for bill acceptors, card dispensers, and or ticket dispensers t.b.d. pending final specifications. { Doors may be manufactured from metal as an alternate.}

4. All exposed edges are to be covered with vinyl "t" molding.

NOTES:
1. All corners are 1" nominal radius unless specified.

2. Cabinet material is 3/4" thick wood composite with woodgrain finish

3. Joining is accomplished using 3/4" x 3/4" pine strips, wood glue, & 1-1/4" wood screws 4. All exposed edges are to be covered with vinyl "t" molding.

LEFT SIDE ELEVATION

SCALE: 1" = 1' - 0"

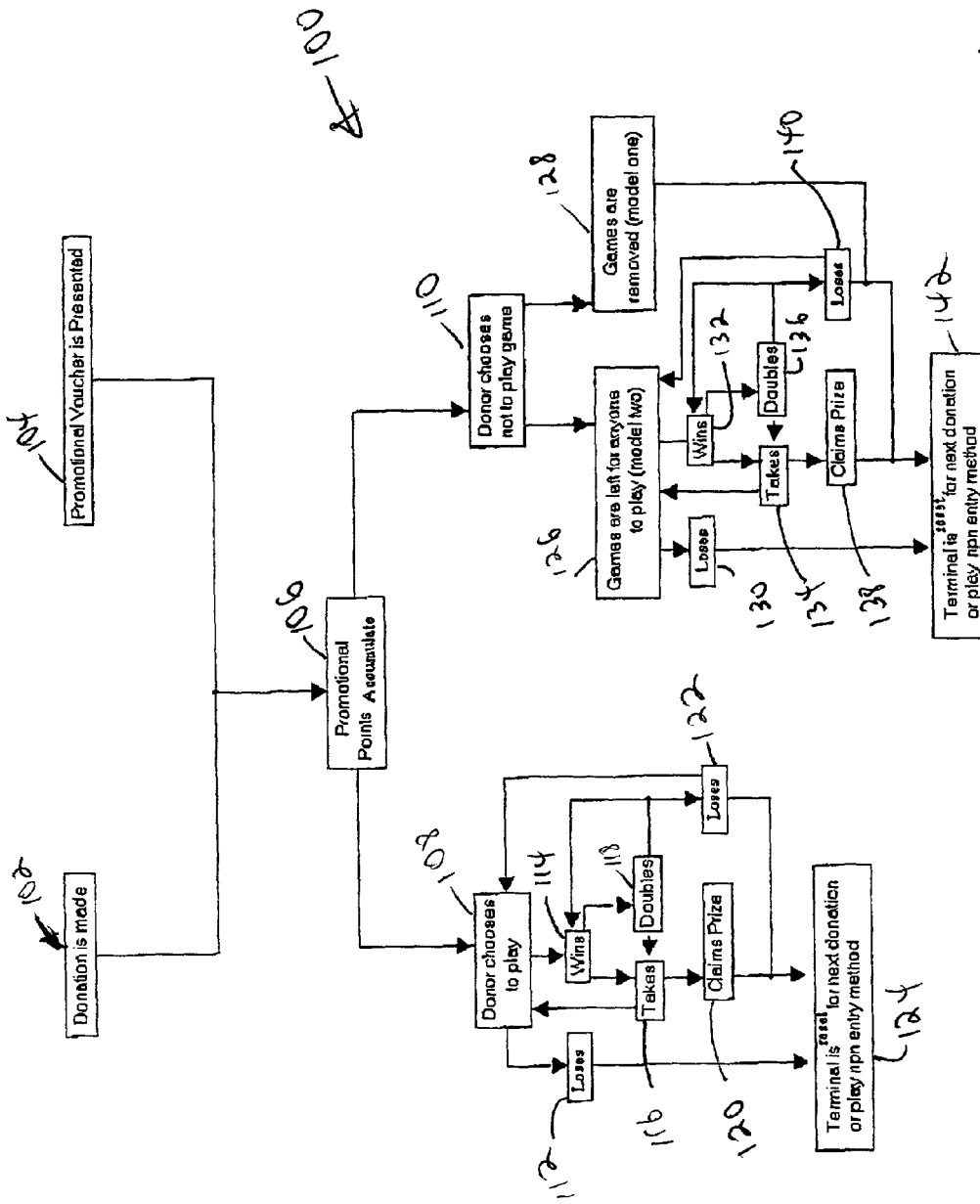

CHARITABLE CONTRIBUTION STATION WITH PROMOTIONAL GAME PIECE FEATURE

BACKGROUND OF THE INVENTION

This invention relates generally to charitable fund raising promotions, and, in particular, to an automated charitable solicitation device and system that includes a promotional game feature. The game feature is used not only to increase exposure of these organizations to potential donors, such as those interested in making donations to charities and civic organizations, but also to expand the locations in which such funds can be solicited. A distinctive feature of this system is the unique manner by which donations are solicited in conjunction with and instant win game. Credits are given for each donation given on an instant win game and an opportunity to play the game is presented. Yet another distinctive feature also allows non-donors the same opportunity to play the instant win game. This promotional play feature allows playing of the game without making any donation and still exposes the charities to the general public.

Obtaining donations by charities and civic organizations has become increasingly harder due to the increased number of groups, organizations, and individuals looking to solicit funds from donors. Additional limitations are found in the limited ways in which the offers to donate to the charities are currently being offered. Therefore, charitable solicitors, fundraisers, and providers are continuously looking for new and unusual ways of attracting attention to their individual charities or organizations.

Most charities rely on repetitive donations. To maintain these donations, charities regularly use displays at retail outlets such as stores and restaurants, walk-a-thons, bake sales, and periodically use telethons, radiothons featuring famous stars, and some prize promotion games. Certain areas allow for charitable gaming, such as bingo, at pre-existing locations with restricted operational hours to raise funds for theses groups. But, this is the exception rather than the rule.

Prize promotions are often tied to products and services throughout the country and have become so common it is expected by the consumer. It is reported that over seventy-five percent of corporate industry uses some form of promotion in the sale and advertisement of their products and companies.

Therefore, it is advantageous to a charitable solicitor or fundraiser to be able to provide a distinguishable and unique promotion in order to expose their organizations purpose and goals encouraging not only current donors to remain loyal but to attract new and repetitive donors to their cause. What is needed is a modern method of soliciting such donations that is efficient and low cost and adds a promotional value to the donation. This method should also move the promotional game out of a typical paper medium and into a unique interactive video medium that modern society has become so accustomed.

SUMMARY OF THE INVENTION

The present invention provides an automated charitable solicitation system and method for soliciting donations that includes a promotional play device that offers an opportunity to play an instant win game. To encourage donations, the solicitation system includes promotional features, which confer credits for amusement play of a video game with each donation. The holder of the credits can play an instant win game in order to try and win more credits. After playing the game, the holder then has the option to save any won credits for future use in an attempt to accumulate more credits, which may eventually lead to a promotional prize. At any point during the game, after the holder accumulates more points than he received for promotional play, the holder has the option to obtain a prize in exchange for the credits.

The operation of the system is overseen by a licensee who assists in the distribution of games and promotional prizes. The licensee may enter credits into the video game system for persons with vouchers for free games, and may also provide for later continuance of the game by withdrawing credits and resetting the number of credits on the machine.

A preferred embodiment of the system combines a conventional microprocessor or computer and video display monitor. These items are operatively connected to a promotional game subsystem that provides the method for operation of the game, and an interface card which allows the input credits for persons presenting vouchers for free play. An optional printer system may also be included for outputting a physical record of the game standings when activated by the winner of the instant win game The promotional game is played by programming the computer with a simple game algorithm of the licensor's choice. In one embodiment of the system, money is inserted and a donation is made or a licensee provides a free credit through the promotional play switch and interface card. The user then has the option of playing the game. If the user chooses not to play there are two options, either the free games are removed and the machine is reset by a credit removal switch or the credits are left for anyone to approach and play with out making a donation. If the user chooses to play, a simple algorithm for the game allows the user to play his promotional credits. If the user loses, the game will automatically remove the played credits and ask if the user wishes to play again through an additional donation. If the user wins then he has the option to either take the existing credits or double up the credits for playing a second game. If the user takes the credits, then he has the choice to either play the game and go through the process again, or he can choose to receive promotional prize awarded for the amount of credits that he has accumulated. If he double up the number of credits, the game is played and if he wins he receives double the number of winning credits and again is provided with the opportunity to take the winnings or play again. If he loses, he then returns to play the remainder of his credits.

BRIEF DESCRIPTION OF THE DRAWINGS

FIG. 2 is a front view of the system showing the control panel, display, and promotional key switch.

FIG. 4 is a block diagram of the basic sequence of playing the promotional game.

DESCRIPTION OF THE PREFERRED EMBODIMENTS

Figure 1:
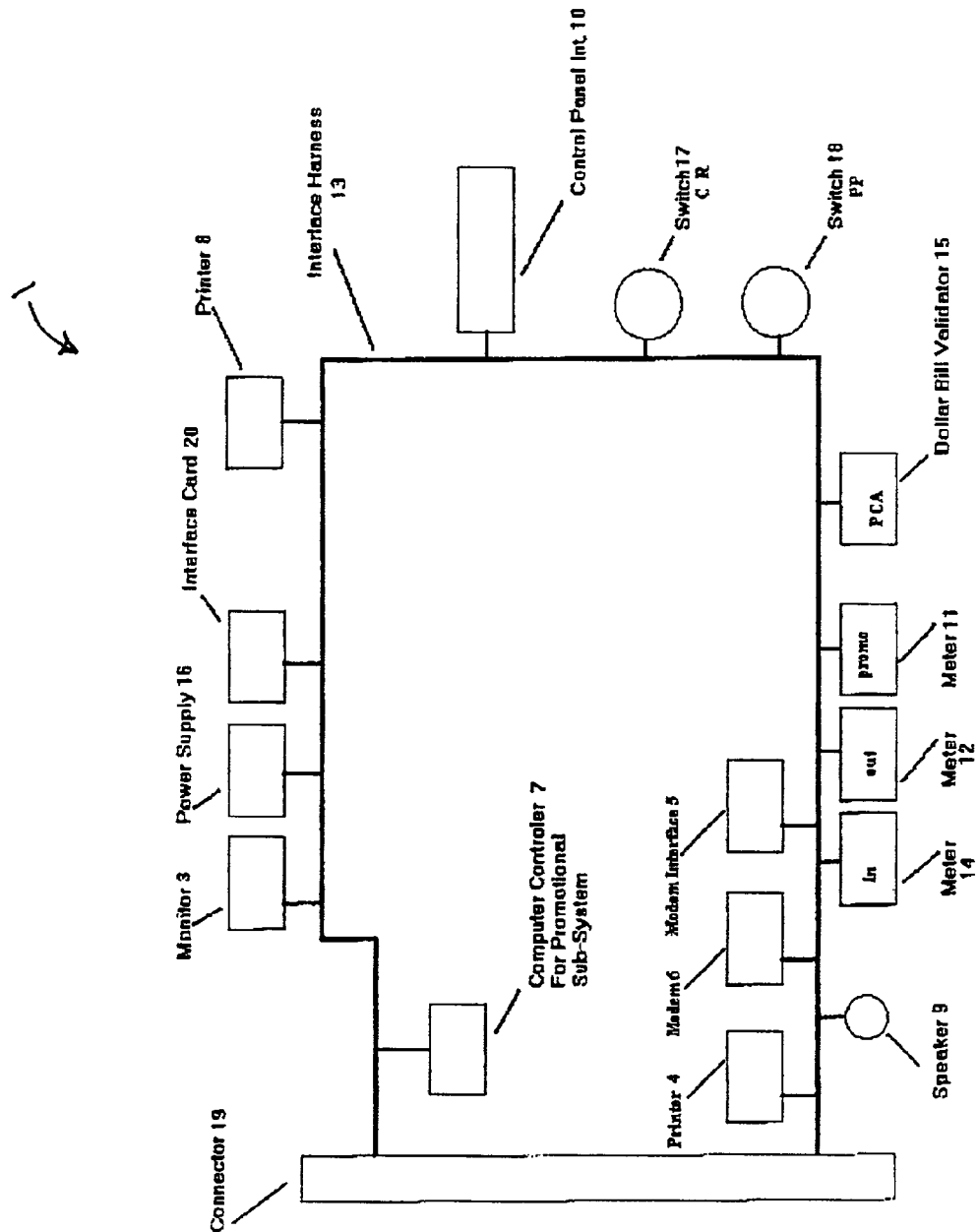
FIG. 1 is a block diagram of the charitable acceptance terminal and promotional game sub-system of the present invention.

Referring now to FIG. 1, the connection of the main components of the Charitable System 1 of the present invention are shown. These include a computer controller 7 which includes a promotional game sub-system, a monitor 3, a user interface control panel 10, and a harness wired interface 13 connected to a main edge connector 19. The computer 7 and user interface control panel 10 are integrated together via the wired interface 13 and may be interfaced through a 72 pin main edge connector 19. The interface 13 incorporates a power supply bus connected to a power supply 16 and a data bus to provide for communication of electrical signals and commands to various electronic and electromechanical devices shown on FIG. 1.

FIG. 1 also shows the general connection of the items which make up the system 1 of the gaming apparatus. These include a connector 19 which is connected to interface harness 13 which allows for connection to the computer controller 7 for the promotional sub-system. Also attached to the interface harness 13 are the monitor 3, the power supply 16, the interface card 20, and the printer 8. Additional items which are connected to the interface harness 13 are the control panel interface 10, the key activated credit removal switch 17, the key activated promotional switch 18, the dollar bill validator and currency acceptor 15, the promotional play meter 11, the credits out meter 12, the credit in meter 14, the modem interface 5, the modem 6, the printer 4, and the speaker 9.

The dollar bill validator and currency acceptor 15 is conventional electromechanical machine used to accept the donation upon insertion of money into the acceptor 15 and distribute promotional play credits into the system 1. While shown as a bill acceptor 15, coin or other types of acceptors may also be used. The currency acceptor 15 is conventionally used in food vending machines. The currency acceptor 15 sends a signal to the computer 7 to register the correct amount of currency-received credits in relation to the value of the bill inserted. The computer 7 then provides the user the opportunity to play a promotional game.

Figure 3:
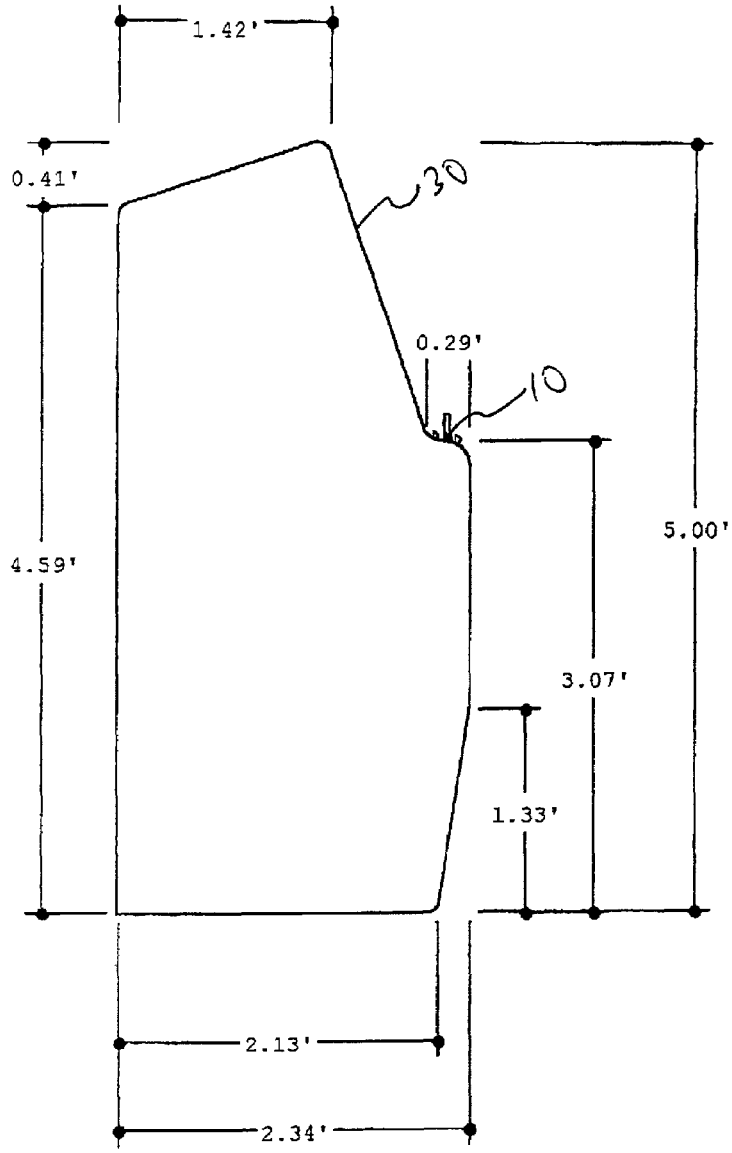
FIG. 3 is a side view of the system shown in FIG. 2.

The user communicates all actions of the game though the user interface control panel 10 in association with the monitor 3 as mounted in the cabinet 30, as shown in FIG. 2. FIG. 3 shows a side view of the cabinet 30 for the system 10. The control panel 10 is a conventional interface between the user and the computer program that allows the user to participate in the promotional game. In the operation of the charitable solicitation system 1, the user first enters paper currency into the currency acceptor 15 and the promotional play switch 18 is set in the first "A" position. The currency acceptor 15 then sends a signal to the computer 7 in relation to the value of the bill entered and registers the credits on the credits in service meter 14. The game system 1 may then be operated.

During the operation of the game system 1, the computer 7 can generate effects to make the game more exciting. The computer 7 generates the game effects using a simple algorithm as part of a promotional game subsystem incorporated into the systems software. A speaker system 9 may be connected to the computer 7 to allow for various sound effects or any other type of beneficial sound. Furthermore, a telephone interface cable and fax modem 6 can be connected by a interface cable and modem interface card 5 to allow the game system 1 to be accessed for accounting or to be played in conjunction with soliciting funds across the internet.

When the user is finished playing the game, the licensee removes the credits by activating the credit removal switch 17, or the user may have the option to depress switches on the control panel 10 and the promotional credits are removed from the system memory. The system memory is constructed of conventional RAM compatible with the computer 7. The remaining credits would then accumulate on credits out of service meter 12 and may also be sent to a printer 4 through the interface harness 13. The credits out of service meter 12 would then provide the licensee a physical record which states the number of credits won or unused by the user. Printer 4 then would provide the user a physical receipt for prizes won and/or a receipt for the amount of the donation given by the user.

The basic sequence of logical operations 100 implemented by software, including the promotional game sub system, is shown in FIG. 4. A person skilled in the art of computer programming could easily implement these steps in the software compatible with the particular processor selected for use with the computer 7.

As shown in FIG. 4 either a donation is made 102 or a promotional voucher is presented 104 to allow for promotional points to be accumulated in the machine. After the user inserts money 102 into the currency acceptor 15, a corresponding currency signal is received by computer 7, which then sends the to the service in meter 14. The computer 7 determines the available credits from either the insertion of money in the currency acceptor 15, at which time the promotional play switch 18 being set to position "B". Optionally, a promotional voucher may be presented 104 and entered into the system 10. The credits accumulate 106 at that point on the credits in service meter 14 and are displayed by the promotional play video monitor 3. The user is then presented with the option of playing the promotional game.

After the promotional points have been accumulated the user has the choice of whether to play the game or not to play the game. If the donor chooses to play the game 108 then he may either win 114 or lose 112 the game.

If the donor loses 112 the game then the terminal is reset 124 for the next donation or play the next series of promotional points.

If the donor wins 114 the game then the donor may either take his winnings 116 or choose to double up 118. If the donor chooses to take 116 his winnings he can choose to play 108 the game again or take his winning 116 and claim a prize 120. If the donor claims a prize 120 then the terminal is reset 124 for the next donation or play.

If the donor wins 114 he can also choose to double his bet 118 and if he wins the doubling of the bet, he may then choose to take 116 his prize. From this point, the user may either choose to play the game again 108 or claim a prize 120. If the user loses 122 the doubling then he can return to choosing to play the game 108 or the terminal may be reset 124 for the next set of play.

Once points have been accumulated and the donor chooses not to play the game 110, the game can either be left for anyone to play 126 or the games can be removed from the system 128. If the games are removed from the system 128 then the terminal is reset 142 for the next donation.

If the games are left for anyone to play 126 then the new person playing the game can either win 132 or lose 130.

If the person loses 130 then the game is reset for the next donation 142.

If the loser wins 132 then he may choose to either take his winnings 134 or double up his credit bet 136 of his winnings.

If the user chooses to double his winnings 136 he may either win and take 134 the winnings or he may lose 140 the winnings and the game may be reset 142.

If the user takes his winnings 134 then he is allowed to either return to game play 126 in order to play with the additional credits or claim his prize 138. If he chooses to claim his prize 138 then the prize is issued and the terminal is reset 142 for the next donation and the next series of play.

In this manner, the present invention describes a system 1 for soliciting charitable contributions from a donor to a named organization which includes a process adapted to play a game. A display 3 is operatively connected to the processor 7 and the processor 7 is adapted to generate organizational information at the display 3 which is associated with a named organization. Silk screened information may also be provided on a plexi-glass screen which covers the monitor 3, or on the sides of the cabinet 30. In this manner advertisements may be provided on the display 3 and cabinet 30 in order to attract individuals to the solicitation system 1. The processor 7 is further adapted to generate game information at the display 3 for playing a game. A donation acceptor 15 is operatively connected to the processor 7 with a donation acceptor 15 adapted to accept the donation to the named organization from the donor and notify the processor 7 of the donation. Finally, a donor control panel 10 is included which is operatively connected to the processor 7. The processor 7 is adapted to receive information from this donor control panel 10 such that the donor can play the game in response to and conditioned upon the donation. In one embodiment to the present invention, the donation acceptor 15 is a currency acceptor adapted to accept monetary donations. In another embodiment to the present invention, the donation acceptor 15 is a credit acceptor adapted to accept and credit input.

A further embodiment of the present invention has a game credit accumulator 14 which is operatively connected to the donation acceptor and the processor. This game credit accumulator 14 is adapted to increment a credit count in response to a donation. This game credit accumulator 14 is also adapted to control the credit count in response to the playing of the game and to store game credits available to the donor for playing the game.

Another embodiment of the invention utilizes a game credit dispenser 4, shown as a printer 4 connected to the processor 7, which is adapted to issue a physical record of the game credits to the donor.

Another embodiment of the present invention utilizes a credit adjuster, shown as credit removal switch 17 and promotional play switch 18, which is adapted to adjust the game credits in the system. Thus, the credit removal switch 17 may be the only included part of the credit adjuster. A further embodiment to the present invention utilizes only a promotional play switch 18 in the credit adjuster.

Another illustrated embodiment to the present invention utilizes an input donation meter 14 operatively connected to the donation acceptor. The input donation meter 14 may be adapted to record the amount of donations. A still further embodiment of the present invention utilizes an output credit meter 12 operatively connected to the processor 7. The output credit meter 12 is adapted to record the outstanding credits issued on to physical records by the printer 4.

Yet a further embodiment to the present invention utilizes a promotional play meter 11 which is operatively connected to the processor 7. This promotional play meter 11 is adapted to record the promotional plays of the game.

Still a further advantage of the present invention is found in the embodiment of the invention which utilizes a modem 6 operatively connected to the processor 7. This modem 6 is adapted to transmit recorded information from the meters 11, 12, 14 or processor 7 about the game.

The apparatus of the present invention and its use teaches a method of soliciting a charitable donation from a donor for a named charity. This method of soliciting a charitable donation includes advertising requests for the donation to the named charity on an electronic promotional game system 1. The method then continues with accepting as a charitable donation from the donor at the electronic promotional game. After converting the charitable donation to a game credit, the system continues by providing the donor with an option to play the game credit on the electronic promotional game as a reward for making a charitable donation.

This method may be further improved by adding the step of sending a record of the donation to an input meter used for accounting. A still further improvement also includes remotely accessing the input meter to acquire the record of the donation. Yet a further improvement to the present method involves accumulating winning game credits in the system when the donor successfully plays a promotional game. A further improvement to this embodiment comprises issuing a physical record of each promotional game credits to the donor. Yet another improvement to this embodiment involves accepting from the donor a physical record of accumulated game credits and electrically entering the accumulated game credits reflected on the physical record into the electronic promotional game so that the donor can play the promotional game. Finally, another improvement to the present invention involves issuing a prize to the donor in exchange for the accumulated game credits.

The information needed to advise the user of his game playing options before and during the game play is generated by the computer 7 and is displayed to the user by monitor 3. The user then communicates with the promotional game, the system is reset via the credit removal switch 17, and the credits are registered on the out service meter 12 and/or to an optional printer 4 to deliver a receipt of the prize. If the user chooses to play the promotional game, then the computer 7 allows the user to play his credits. If the user loses, then the system is reset by the computer 7 and the system resets to accept another donation from the same or different user for a specified amount of money.

If the user wins, then he has the option to either quit the game or to double up. If the user chooses not to play, then he can receive the accumulated credits and a promotional prize. If the user chooses to double up, then he plays again. If he loses, the game automatically requests another amount to played. If he wins, he has the option to either take the credits or play again. If he takes the credits, then he receives the accumulated credits that can be used to get a promotional prize awarded for the amount of credits that he has accumulated.

When the user decides to withdraw from the game, the licensee would then activate the credit removal switch 17 or the user could activate a printer 4 by depressing a user interface button on the control panel 10, which would in either case send a signal to the computer 7 to send the accumulated points into the out service meter 12 in the former and to the printer 4 in the latter. The user would then in either case sign a promotional prize claim form to receive his prize.

As further option, a user may request a free game voucher from the licensee of the system. When the user presents the game voucher to the licensee, the licensee can enter promotional game credits for that user by the means of the promotional play switch 18, which is set to position "B".

Thus, although there have been described particular embodiments of the present invention of a new and useful charitable solicitation terminal with promotional feature, it is not intended that such references be construed as limitations upon the scope of this invention except as set forth in the following claims.

What is claimed is:

1. An apparatus for soliciting monetary donations from a donor to a donee, the apparatus comprising:
   a video display;
   a donation acceptor generating a donation received signal in response to receiving a monetary donation from a donor, the donation received signal corresponding to the monetary value of the donation;
   a computer operatively connected to the display and to the donation acceptor, the computer receiving the donation received signal and determining a promotional credits score corresponding to the donation received signal, the computer further determining an accumulated promotional credits score including the promotional credits score, the computer comprising:
      a memory, the memory storing the promotional credits score and the accumulated promotional credits score;
      an executable video game software resident in the memory, the video game software causing the computer to generate and operate a promotional video game for play by a donor in response to and conditioned on receipt of the donation received signal, each play of the video game conditioned on selection of a promotional credit wager;
      an executable donee information software resident in the memory, the donee information software causing the computer to generate information associated with a donee at the display; and
      an executable game information software resident in the memory, the game information software causing the computer to generate game information at the display for playing the promotional video game, the game information including the accumulated promotional credits score and the selected promotional credit wager; and
   a donor control panel operatively connected to the computer, the donor control panel configured to allow the donor to select a game play input during the operation of the promotional game, the selected game input including the selected promotional credit wager, the donor control panel communicating a selected game play input signal to the computer in response to receipt of the selected game play input.

2. The apparatus of claim 1, wherein the selected promotional credit wager comprises at least a portion of the accumulated promotional credits.

3. The apparatus of claim 1, wherein the selected promotional credit wager comprises at least a portion of the winning score of the previous promotional play of the video game.

4. The apparatus of claim 1, wherein the donation acceptor comprises a currency acceptor.

5. The apparatus of claim 1, wherein the donation acceptor comprises a credit card acceptor.

6. The apparatus of claim 1, further comprising:
   a game credit accumulator operatively connected to the donation acceptor and to the computer, the computer further comprising a game credit software resident on the memory and causing the computer to:
   increment the accumulated promotional credits score by an amount corresponding to the promotional credits score in response to a donation received signal;
   increment or decrement the accumulated promotional credits score in response to the playing of the promotional game, and
   store the accumulated promotional credits score available to the donor for playing the promotional game.

7. The apparatus of claim 1, further comprising:
   a game credit dispenser operable to dispense a physical record of at least a selected portion of the accumulated promotional credits score to the donor.

8. The apparatus of claim 7, the game credit dispenser including a printer.

9. The apparatus of claim 1, further comprising:
   a credit adjustor operably connected to the computer for adjusting the accumulated promotional credits score.

10. The apparatus of claim 9, wherein the credit adjustor includes a credit removal switch.

11. The apparatus of claim 9, wherein the credit adjustor includes a promotional play switch.

12. The apparatus of claim 1, further comprising:
    an input donation meter operatively connected to the donation acceptor, the input donation meter recording the monetary amount of the donation in response to the donation received signal.

13. The apparatus of claim 7, further comprising:
    an output credit meter operatively connected to the computer, the output credit meter recording the selected portion of the accumulated promotional credits score issued by the game credit dispenser.

14. The apparatus of claim 1, further comprising:
    a promotional play meter operatively connected to the computer, the promotional play meter recording plays of the promotional game.

15. The apparatus of claim 1, further comprising:
    a modem operatively connected to the computer.

* * * * *